United States Patent
Carlucci et al.

(10) Patent No.: US 10,648,607 B2
(45) Date of Patent: May 12, 2020

(54) PROCESS FOR LINING A STEEL PIPE FOR THE SUBSEA TRANSPORT OF FLUIDS

(71) Applicant: SAIPEM S.A., Montigny le Bretonneux (FR)

(72) Inventors: Antonio Carlucci, Milan (IT); Eric Kerdiles, Marcq (FR); Roberto Palladini, Milan (IT)

(73) Assignee: SAIPEM S.A., Montigny le (FR)

( * ) Notice: Subject to any disclaimer, the term of this patent is extended or adjusted under 35 U.S.C. 154(b) by 0 days.

(21) Appl. No.: 16/495,618

(22) PCT Filed: Feb. 22, 2018

(86) PCT No.: PCT/FR2018/050429
§ 371 (c)(1),
(2) Date: Sep. 19, 2019

(87) PCT Pub. No.: WO2018/172643
PCT Pub. Date: Sep. 27, 2018

(65) Prior Publication Data
US 2020/0041062 A1 Feb. 6, 2020

(30) Foreign Application Priority Data
Mar. 20, 2017 (FR) ...................... 17 52255

(51) Int. Cl.
*B23K 9/00* (2006.01)
*F16L 58/08* (2006.01)
(Continued)

(52) U.S. Cl.
CPC ........... *F16L 58/08* (2013.01); *F16L 13/0263* (2013.01); *F16L 58/181* (2013.01); *B23K 9/048* (2013.01);
(Continued)

(58) Field of Classification Search
CPC ..... F16L 13/02; F16L 13/0263; F16L 55/165; F16L 47/02; F16L 55/1651; F16L 55/18; F16L 13/0227; B23K 2101/06; B23K 33/006; B23K 9/0286; B23K 2101/10; B23K 9/0282; B23K 9/0284; B23K 37/0531; B23K 9/16; B23K 9/18; B23K 28/02; B23K 9/0358
See application file for complete search history.

(56) References Cited

U.S. PATENT DOCUMENTS 5,001,320 A * 3/1991 Conley ............... B23K 9/0358
219/60 R
8,366,351 B2 2/2013 Rocher
(Continued)

FOREIGN PATENT DOCUMENTS

CN 103008988 A 4/2013
JP S60222682 A 11/1985
(Continued)

OTHER PUBLICATIONS

International Search Report and Written Opinion from PCT/FR2018/050429, dated May 3, 2018.
(Continued)

*Primary Examiner* — Erin B Saad
(74) *Attorney, Agent, or Firm* — Workman Nydegger

(57) ABSTRACT

A process for lining a steel pipe for the subsea transport of fluids comprises machining of an annular cavity in an inner wall of the pipe to be lined. The cavity is set back longitudinally relative to an end of the pipe. The deposition by welding of a first resurfacing layer includes a corrosion-resistant metal alloy on the inside of the cavity. Surface machining of the first resurfacing layer is done to the internal diameter of the pipe. A liner made of corrosion-resistant steel alloy is introduced into the pipe. Deposition by welding includes at least one second resurfacing layer made of corrosion-resistant metal alloy on the inner wall of the pipe between the end of the liner in contact with the first machined resurfacing layer and the corresponding end of the pipe. Surface machining of the second resurfacing layer is done to the internal diameter of the pipe.

11 Claims, 3 Drawing Sheets

(51) Int. Cl.
  *F16L 13/02*    (2006.01)
  *F16L 58/18*    (2006.01)
  *B23K 103/04*   (2006.01)
  *B23K 101/10*   (2006.01)
  *B23K 9/04*     (2006.01)

(52) U.S. Cl.
  CPC ...... *B23K 2101/10* (2018.08); *B23K 2103/04* (2018.08)

(56) References Cited

U.S. PATENT DOCUMENTS

| | | | |
|---|---|---|---|
| 2002/0038954 A1* | 4/2002 | Andreoli | F16L 13/0227 285/288.1 |
| 2007/0284872 A1* | 12/2007 | Pionetti | F16L 1/19 285/55 |
| 2010/0028085 A1 | 2/2010 | Rocher | |

FOREIGN PATENT DOCUMENTS

| | | |
|---|---|---|
| WO | 2008037907 A1 | 4/2008 |
| WO | 2015087162 A1 | 6/2015 |

OTHER PUBLICATIONS

French Search Report from FR Application No. 1752255, Nov. 22, 2017.

\* cited by examiner

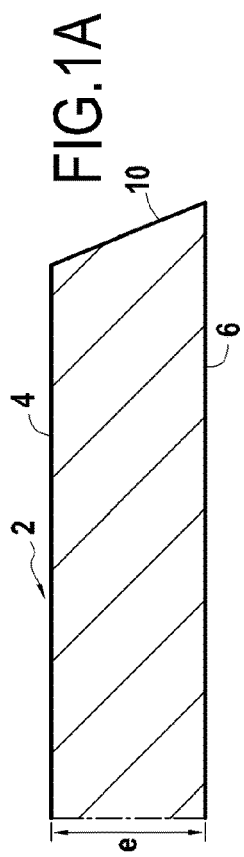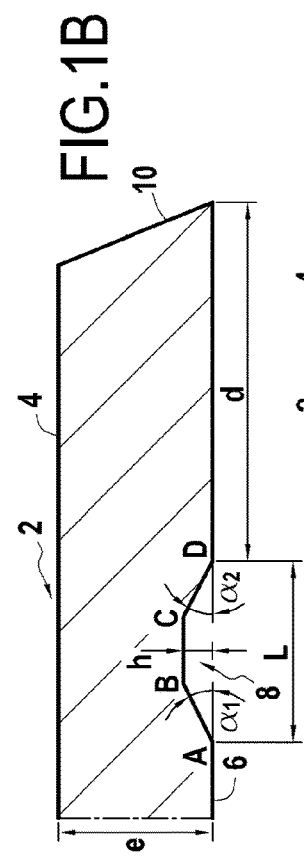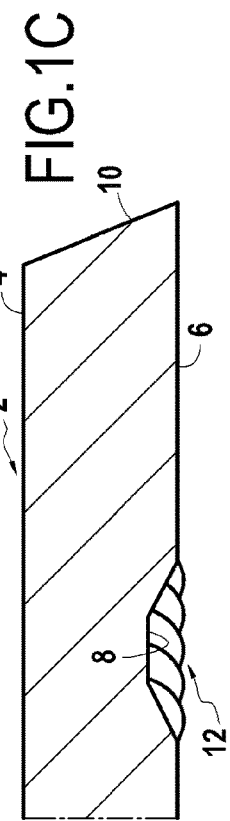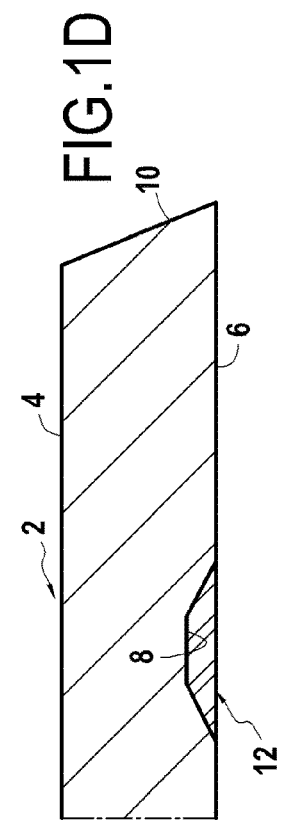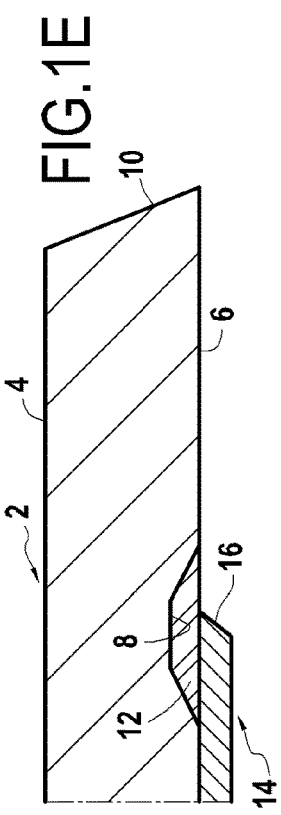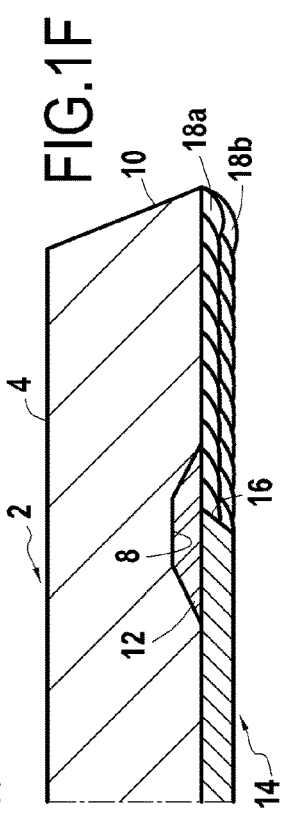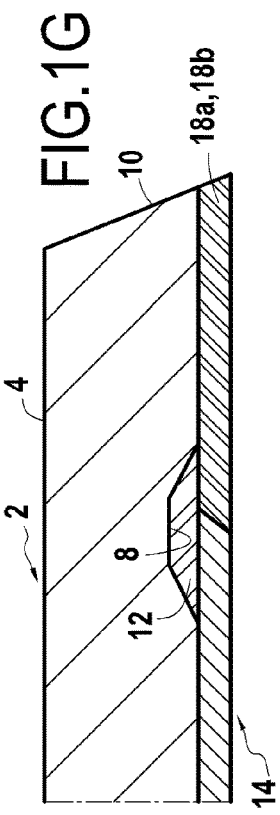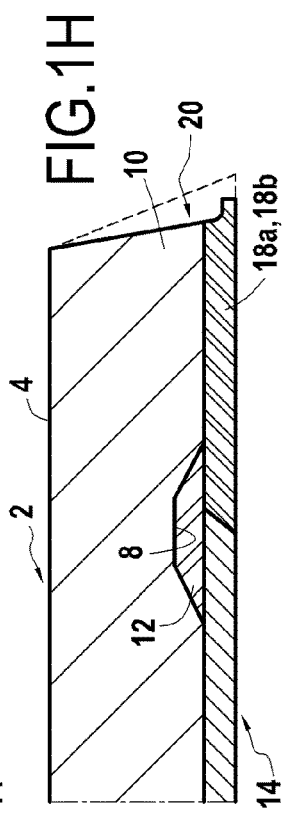

PROCESS FOR LINING A STEEL PIPE FOR THE SUBSEA TRANSPORT OF FLUIDS

BACKGROUND OF THE INVENTION

The present invention relates to the general field of fluid transport pipes, in particular subsea pipes, lying on the seabed or providing the seabed-to-surface connection for the transfer of hydrocarbons, for example oil and gas, from subsea production wells.

More specifically, the invention relates a process for lining such pipes made of carbon steel to clad them internally with a corrosion-resistant alloy layer (for example Inconel®).

Some subsea hydrocarbon transport pipes, and in particular pipes providing a seabed-to-surface connection, called risers, are internally lined with an alloy steel layer typically between 2.5 mm and 5 mm thick to create a corrosion barrier and to improve the mechanical and chemical properties of the pipe.

Pipes lined internally with such a corrosion-resistant alloy layer are generally obtained by mechanically bonding the alloy layer (also called liner) to the pipe body. At each end of the pipe, the corrosion-resistant alloy layer is connected to the pipe body by overlapping weld seams, the filler metal usually being Inconel® based.

More precisely, the known liner processes of the prior art propose to force the corrosion-resistant alloy layer into the pipe, to deposit a weld bead at each end of the pipe to provide support at the ends of the alloy layer, and then to perform surface machining of the weld bead to the internal diameter of the pipe.

For example, document WO 2015/087162 discloses a process for connecting two pipe elements, each with a corrosion-resistant alloy liner. According to this invention, it is provided to carry out a finishing machining of each end of the pipe to form bevels for the deposition of a weld bead intended for assembling the pipe elements together, then to machine the end portions of the liner of each pipe element in order to deposit a weld overlay. The weld overlay is then machined to the internal diameter of the pipe.

However, such lining processes have certain disadvantages, particularly in terms of the fatigue strength of the lined pipe thus obtained. Indeed, when the pipe is subjected to significant fatigue, discontinuity at the interface between the corrosion-resistant alloy liner and the weld overlay can initiate cracks that may propagate through the thickness of the pipe until it causes the fatigue failure of the steel it contains.

SUBJECT-MATTER AND SUMMARY OF THE INVENTION

The principal aim of the present invention is therefore to overcome such disadvantages by proposing to improve fatigue strength at the interface between the corrosion-resistant alloy liner and the weld overlay to obtain a lined steel pipe.

In accordance with the invention, this aim is achieved by a process of lining a steel pipe for the subsea transport of fluids, comprising successively:

the machining of an annular cavity in an inner wall of the pipe to be lined, said cavity being set back longitudinally relative to one end of the pipe;

the deposition by welding of a first resurfacing layer made of corrosion-resistant metal alloy on the inside of the cavity;

the surface machining of the first resurfacing layer to the internal diameter of the pipe;

the introduction into the pipe of a liner made of corrosion-resistant steel alloy, the liner being introduced so that one end of said liner comes into contact with the first machined resurfacing layer;

the deposition by welding of at least one second resurfacing layer made of corrosion-resistant metal alloy on the inner wall of the pipe between the end of the liner in contact with the first machined resurfacing layer and the corresponding end of the pipe; and the surface machining of the second resurfacing layer to the internal diameter of the pipe.

The lining process according to the invention provides for the deposition of a first resurfacing layer on the inner wall of the pipe perpendicular to the end of the liner, which is the area most sensitive to fatigue crack initiation and propagation. Since this first resurfacing layer has better mechanical properties than does the pipe, it also limits cracking. The result is an improvement in the fatigue strength of the pipe.

In particular, it has been calculated that for a typical example of application under average stress range conditions, the improvement factor obtained through the implementation of the invention on fatigue endurance compared with a liner interface of the prior art is between 1.7 and 2.1, i.e. the improvement in fatigue endurance is between 170% and 200% (or even higher) compared with the prior art. Better fatigue performance allows the use of lined pipes for dynamic applications, which is not the case with lined pipes of the prior art.

Moreover, the lining process according to the invention does not generate any problems that could be related to the weldability of the overlay and to the weld seam between two pipes. In addition, the implementation of this lining process does not require any additional time at sea compared with processes of the prior art.

In an advantageous arrangement, the cavity is machined to have a trapezoidal cross-section. In this case, the trapezoid preferably has a height between 1 and 5 mm, a base length between 10 and 40 mm, and two angles adjacent to the base each between 20 and 50°.

According to another advantageous arrangement, the process involves the deposition of two second superposed resurfacing layers on the inner wall of the pipe between the end of the liner in contact with the first machined resurfacing layer and the corresponding end of the pipe.

The process may further include a finishing machining of the end of the pipe and of the end of the second resurfacing layer to form a bevel allowing butt-joining with another pipe.

The first resurfacing layer and the second resurfacing layer can be made of Inconel 625®. Similarly, the pipe can be made of carbon steel and have a thickness between 8 and 70 mm. The liner can be forced into the pipe.

In still another arrangement, the process further includes the machining of the end of the pipe to reduce its thickness, the deposition by welding of a third resurfacing layer made of corrosion-resistant metal alloy at the machined end of the pipe, and the surface machining of the third resurfacing layer to the internal diameter of the pipe.

The end of the pipe can be machined to a length between 15 and 20 mm and a height between 1 and 5 mm. The third resurfacing layer can be made of Inconel 625®.

BRIEF DESCRIPTION OF THE DRAWINGS

Other features and advantages of the present invention will emerge from the description given below, with reference to the accompanying drawings which illustrate exemplary embodiments without any limiting character. On the figures:

FIGS. 1A to 1H illustrate different steps of an exemplary implementation of the process according to the invention;

DETAILED DESCRIPTION OF THE INVENTION

Figure 2A:
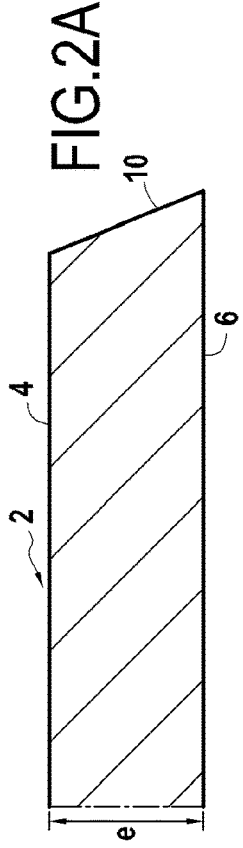
FIGS. 2A to 2H illustrate different steps of another exemplary implementation of the process according to the invention.

The process according to the invention applies to the lining of any steel pipe intended for the transport of fluids, in particular subsea pipes, lying on the seabed or providing the seabed-to-surface connection for the transfer of hydrocarbons, for example oil and gas, from subsea production wells.

Lining of a steel pipe is defined here as the process by which the inside of the pipe is covered (or cladded) with a corrosion-resistant alloy layer to improve the mechanical and chemical properties of the pipe.

FIGS. 1A to 1H schematically illustrate the different steps of the process of lining a pipe according to one embodiment of the invention.

FIG. 1A shows a steel pipe 2, for example made of carbon steel, having a thickness e delimited between its outer wall 4 and inner wall 6 typically between 8 and 70 mm.

According to a first step of the process illustrated in FIG. 1B, it is provided to machine an annular cavity 8 in the inner wall 6 of the pipe to be lined 2, this cavity being set back longitudinally relative to the end 10 of the pipe.

As used here, "cavity set back longitudinally relative to the end of the pipe" means that this cavity does not open at this end (it is offset longitudinally relative to this end).

By way of example, for a pipe having a thickness e between 8 and 70 mm, the cavity 8 can be set back by a distance d of 50 to 300 mm relative to the end 10 of the pipe.

According to an advantageous arrangement, the cavity 8 is machined to have a trapezoidal cross-section ABCD with the base [AD] arranged on the inside of the pipe.

Preferably, for a pipe having a thickness e between 8 and 70 mm, such a trapezoid ABCD has a height h which is between 1 mm and e/2 mm, a length L of the base [AD] between 10 and 40 mm, and two angles adjacent to the base (namely the angles $\alpha 1$ and $\alpha 2$ formed respectively between [AB] and [AD] and between [CD] and [DA]) which are each between 20 and 50°.

Indeed, it was found that this particular shape of the cavity, with the above-mentioned dimensions, had the optimal design to ensure a good compactness of the weld seams and thus to eliminate the risk of defects that could have a harmful effect on fatigue strength.

According to a second step of the process illustrated in FIG. 1C, it is provided to carry out a deposition by welding of a first resurfacing layer 12 made of corrosion-resistant metal alloy inside the previously machined cavity 8.

Preferably, the first resurfacing layer 12 will be made of Inconel 625®, i.e. Ni 61/Cr 22/Mo 9/Fe 5 alloy. Such an alloy is particularly renowned for its high strength and corrosion resistance properties.

Once the first resurfacing layer 12 has been deposited, it is provided, during a step shown in FIG. 1D, to machine its surface to the internal diameter of the pipe. In this way, the first resurfacing layer is flush with the inner surface of the pipe.

The next step of the process is to introduce into the pipe 2 a liner 14 made of corrosion-resistant steel alloy, it being introduced so that its end 16 comes into contact with the first resurfacing layer 12 (FIG. 1E).

In other words, the end 16 of the liner 14 is perpendicular to the cavity 8 filled by the deposition of the first resurfacing layer 12.

By way of example, the liner 14 can be made of stainless-steel alloy, particularly 316L Inconel 625®, and typically have a thickness between 2 and 5 mm. In a known way, it is forced into the pipe. The length of the liner is calculated so that it is equal to the distance between the middle of the two opposite cavities 8 of the pipe.

As shown in FIG. 1F, the next step of the process is to deposit by welding at least one second resurfacing layer made of corrosion-resistant metal alloy on the inner wall 6 of the pipe between the end 16 of the liner 14 (which is in contact with the first machined resurfacing layer 12) and the corresponding end 10 of the pipe.

In the example shown in FIG. 1F, taking into account the thickness of the liner 14 made of corrosion-resistant steel alloy (between 2 and 5 mm), it is provided to deposit on the inner wall of the pipe two second resurfacing layers 18a, 18b superimposed on each other. Preferably, the first second resurfacing layer 18a deposited can be machined to minimize defect initiation.

The second resurfacing layer(s) 18a, 18b is (are) then machined to the internal diameter of the pipe in a step illustrated in FIG. 1G.

According to a final step shown in FIG. 1H, a finishing machining of the end 10 of the pipe 2 and of the corresponding end of the second resurfacing layers 18a, 18b can also be provided to form a bevel portion 20 for the deposition of a weld bead for the butt-joining of two pipes.

The carbon steel pipe thus obtained is provided with an internal cladding formed by a corrosion-resistant metal alloy liner, the latter being connected at each end of the pipe by the second resurfacing layer(s) made of corrosion-resistant metal alloy. The ends 16 of the liner 14 are also located perpendicular to the cavities 8 filled by first resurfacing layers 12 in order to limit the propagation of a possible crack.

Figure 3:
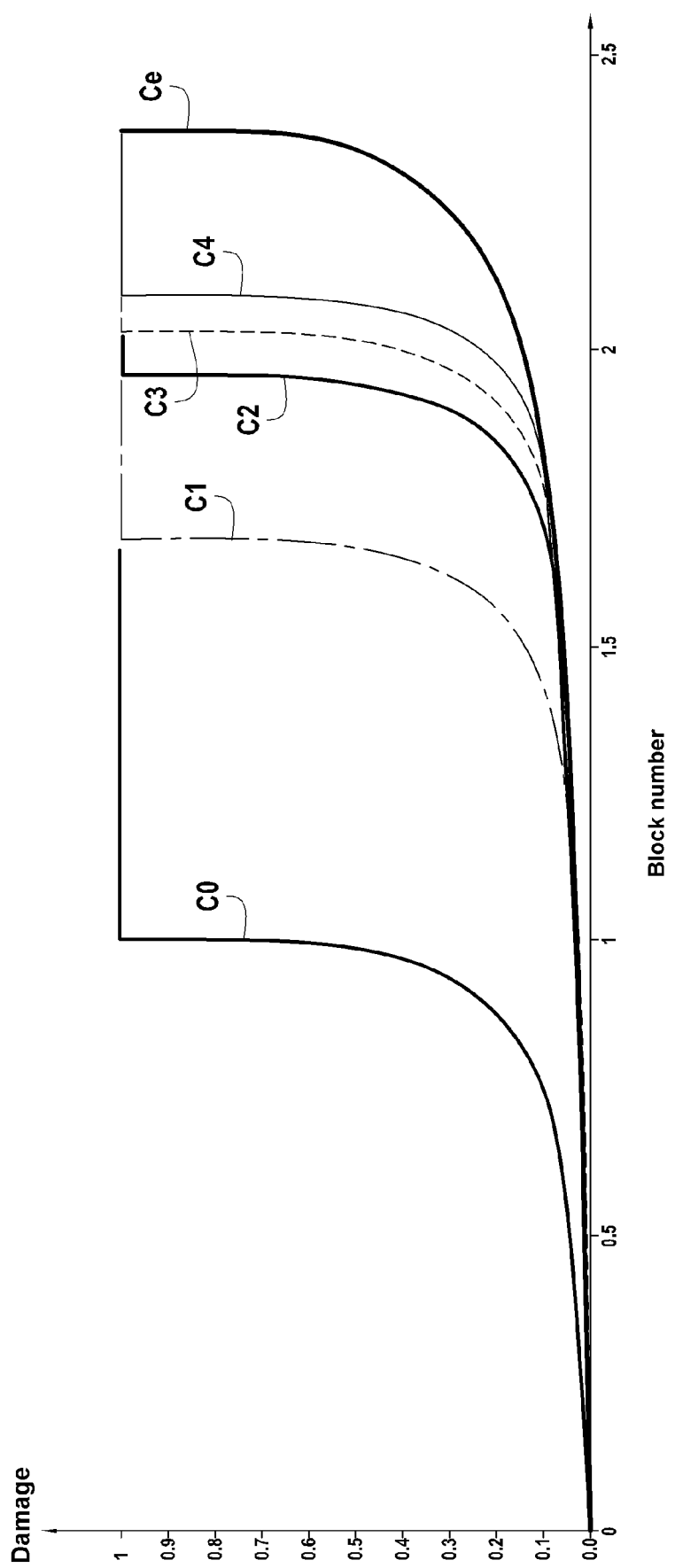
FIG. 3 is a graph showing the impact on fatigue endurance obtained by the implementation of the process according to the invention.

FIG. 3 illustrates, for purposes of information, the improvement gains obtained through the implementation of the invention on fatigue endurance compared with a liner interface of the prior art.

This FIG. 3 shows several gain curves on the fatigue endurance of carbon steel pipes provided with an internal cladding formed by a corrosion-resistant alloy steel liner compared with a pipe lined according to the prior art.

More precisely, the curve C0 is obtained with a 27.9 mm thick carbon steel pipe subjected to cyclic loading with a stress range of 100 MPa. This pipe is lined with a corrosion-resistant steel alloy liner according to a lining process in accordance with the prior art, i.e. a process wherein a single weld seam with two layers is deposited at each end of the pipe to provide a hold at the ends of the liner. This standard curve C0 is therefore affected by a damage equal to 1.

The curves C1 to C4 show gains in fatigue endurance in terms of block numbers for different thicknesses of the first resurfacing layer 12 made of corrosion-resistant metal alloy deposited inside the cavity 8 (the thickness of the first resurfacing layer being equal to the height h of the cavity 8).

Thus, the curve C1 corresponds to a first resurfacing layer 12 having a thickness of 1 mm; the curve C2 to a first resurfacing layer having a thickness of 2 mm; the layer C3 to a first resurfacing layer having a thickness of 2.5 mm; and the layer C4 to a first resurfacing layer having a thickness of 3 mm. Finally, the curve Ce corresponds to a first resurfacing layer having the same thickness as the pipe, here 27.9 mm.

It can thus be seen that the larger the height of the machined cavity (and the thicker the first resurfacing layer), the greater the gain in fatigue endurance. Indeed, this gain increases from 1.7 for the curve C1 to 2.1 for the curve C4.

Of course, it is advisable to obtain the right compromise so that this cavity height is large enough to obtain a gain on endurance at high fatigue without excessively weakening the pipe by reducing its thickness too much locally.

In connection with FIGS. 2A to 2H, different steps in the process of lining a pipe according to another embodiment of the invention will now be described.

In this other embodiment, all the steps described in connection with FIGS. 1A to 1H are reproduced identically and are therefore not described again here (the reference characters remain unchanged).

Figure 2B:
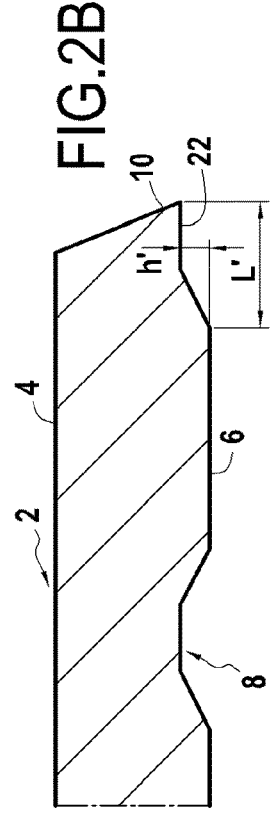

Compared with the embodiment described above, it is also provided to perform a machining of the end 10 of the pipe 2 to reduce its thickness (FIG. 2B).

For example, this machining consists of an open annular cavity 22 which has a cross-section in the shape of a half-trapezoid with a height h' between 1 and 5 mm and a length L' between 15 and 20 mm (for a pipe 2 having a thickness e between 8 and 70 mm).

Compared with the cavity 8 described in connection with the previous embodiment, this open cavity 22 opens at the end 10 of the pipe 2.

Figure 2C:
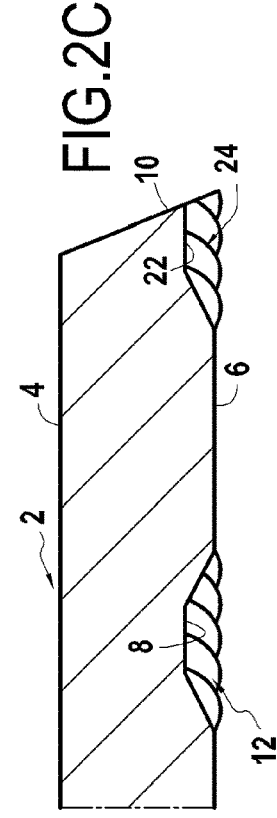

As shown in FIG. 2C, once the open cavity 10 has been machined, it is provided to perform a deposition by welding of a third resurfacing layer 24 made of a resistant metal alloy on the inside of the open cavity (i.e. at the machined end of the pipe).

As with the other resurfacing layers made of resistant metal alloy, this third resurfacing layer 24 is preferably made of Inconel 625®.

Figure 2D:
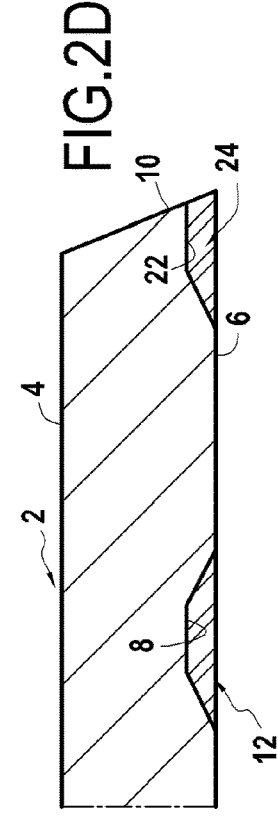

Like the first resurfacing layer 12, this third resurfacing layer 24 is then surface machined to the internal diameter of the pipe 2 (FIG. 2D).

Figure 2E:
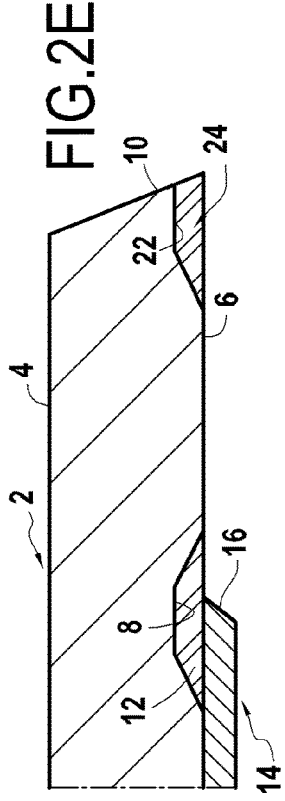

The corrosion-resistant alloy steel liner 14 can then be introduced into the pipe 2 so that its end 16 comes into contact with the first resurfacing layer 12 (FIG. 2E).

Figure 2F:
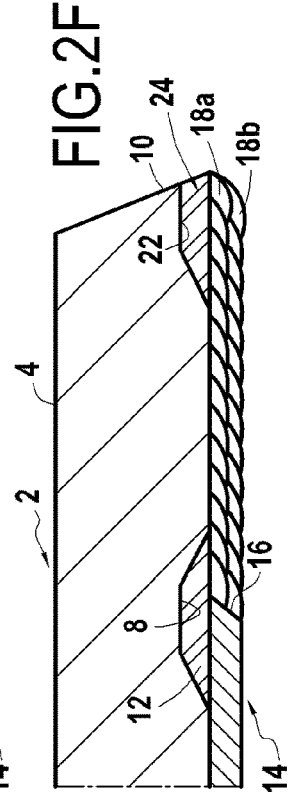

At least one second resurfacing layer (and preferably two second resurfacing layers 18a, 18b) made of corrosion-resistant metal alloy are then deposited by welding on the inner wall 6 of the pipe between the end 16 of the liner 14 and the corresponding end 10 of the pipe (FIG. 2F).

Figure 2G:
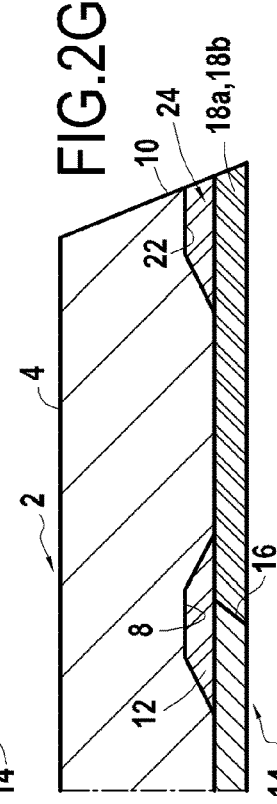

Once deposited, these second resurfacing layers 18a, 18b are surface machined to the internal diameter of the pipe 2 (FIG. 2G).

Figure 2H:
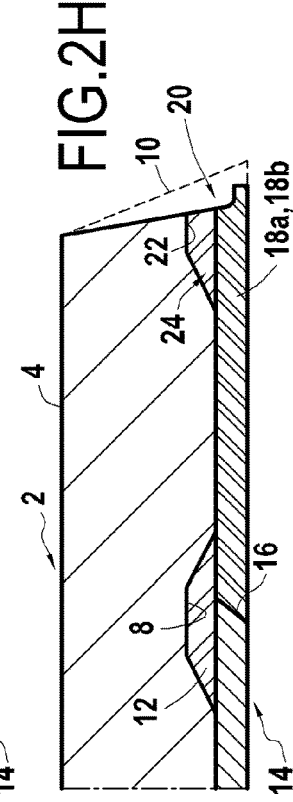

Finally, provision may be made for a finishing machining of the end 10 of the pipe 2 and of the corresponding end of the second resurfacing layers 18a, 18b to form a bevel portion 20 for the deposition of a weld bead for butt-joining two pipes (FIG. 2H).

Compared with the embodiment described in connection with FIGS. 1A to 1H, this embodiment prevents crack propagation initiated in the heat-affected zone during circular butt welding with another pipe. In addition, this allows the acceptance criteria for initial defects in the circular welds to be increased. Finally, this improves the alignment between the ends of two pipes during butt welding.

The invention claimed is:

1. A process for lining a steel pipe for subsea transport of fluids, comprising successively:
    machining of an annular cavity in an inner wall of the pipe to be lined, said cavity being set back longitudinally relative to an end of the pipe;
    deposition by welding of a first resurfacing layer made of a corrosion-resistant metal alloy on the inside of the cavity;
    surface machining of the first resurfacing layer to an internal diameter of the pipe;
    introduction into the pipe of a liner made of corrosion-resistant steel alloy, the liner being introduced so that one end of said liner comes into contact with the first machined resurfacing layer;
    deposition by welding of at least one second resurfacing layer made of corrosion-resistant metal alloy on the inner wall of the pipe between the end of the liner in contact with the first machined resurfacing layer and the corresponding end of the pipe; and
    surface machining of the second resurfacing layer to the internal diameter of the pipe.

2. The process according to claim 1, wherein the cavity is machined to have a trapezoidal cross-section.

3. The process according to claim 2, wherein the trapezoid has a height between 1 and 5 mm, a length of a base between 10 and 40 mm, and two angles adjacent to the base each between 20 and 50°.

4. The process according to claim 1, comprising deposition of two second superposed resurfacing layers on the inner wall of the pipe between the end of the liner in contact with the first machined resurfacing layer and the corresponding end of the pipe.

5. The process according to claim 1, further comprising a finishing machining of the end of the pipe and of the end of the second resurfacing layer to form a bevel allowing butt-joining with another pipe.

6. The process according to claim 1, wherein the first resurfacing layer and the second resurfacing layer are made of an alloy comprising Ni, Cr, Mo, and Fe.

7. The process according to claim 1, wherein the pipe is made of carbon steel and has a thickness between 8 and 70 mm.

8. The process according to claim 1, wherein the liner is forced into the pipe.

9. The process according to claim 1, further comprising:
    machining of the end of the pipe to reduce its thickness;
    deposition by welding of a third resurfacing layer made of corrosion-resistant metal alloy at the machined end of the pipe; and
    surface machining of the third resurfacing layer to the internal diameter of the pipe.

10. The process according to claim 9, wherein the machined end of the pipe is machined to a length between 15 and 20 mm and a height between 1 and 5 mm.

11. The process according to claim 9, wherein the third resurfacing layer is made of an alloy comprising Ni, Cr, Mo, and Fe.

* * * * *